United States Patent
Zhou

(10) Patent No.: US 12,425,807 B2
(45) Date of Patent: Sep. 23, 2025

(54) DATA PROCESSING METHOD, APPARATUS AND SYSTEM, AND COMPUTER-READABLE STORAGE MEDIUM

(71) Applicant: MOBVOI INFORMATION TECHNOLOGY COMPANY LIMITED, Beijing (CN)

(72) Inventor: Wenjie Zhou, Beijing (CN)

(73) Assignee: MOBVOI INFORMATION TECHNOLOGY COMPANY LIMITED, Beijing (CN)

( * ) Notice: Subject to any disclaimer, the term of this patent is extended or adjusted under 35 U.S.C. 154(b) by 321 days.

(21) Appl. No.: 18/082,079

(22) Filed: Dec. 15, 2022

(65) Prior Publication Data

US 2023/0122488 A1    Apr. 20, 2023

Related U.S. Application Data

(63) Continuation of application No. PCT/CN2021/070715, filed on Jan. 7, 2021.

(30) Foreign Application Priority Data

Jun. 16, 2020 (CN) .......................... 202010549076.5
Jun. 16, 2020 (CN) .......................... 202010550309.3
Jun. 16, 2020 (CN) .......................... 202010550508.4

(51) Int. Cl.
*H04W 4/029* (2018.01)
*G06F 1/16* (2006.01)
*H04B 17/318* (2015.01)

(52) U.S. Cl.
CPC ............ *H04W 4/029* (2018.02); *G06F 1/163* (2013.01); *H04B 17/318* (2015.01)

(58) Field of Classification Search
None
See application file for complete search history.

(56) References Cited

U.S. PATENT DOCUMENTS 11,200,786 B1 * 12/2021 Madden ............. G08B 13/1672
2018/0327000 A1 * 11/2018 Jovenall ................ B61L 25/025
2019/0346905 A1    11/2019 Song et al.

FOREIGN PATENT DOCUMENTS

CN    101493335 A    7/2009
CN    202929407 U    5/2013

(Continued)

*Primary Examiner* — Adolf Dsouza
(74) *Attorney, Agent, or Firm* — Birch, Stewart, Kolasch & Birch, LLP

(57) ABSTRACT

Provided are a data processing method, apparatus and system. The method is applied to a first electronic device, the first electronic device includes a first processing unit that runs a first operating system and a second processing unit that runs a second operating system, and the working energy consumption of the first processing unit is less than the working energy consumption of the second processing unit. The method includes: the first processing unit executing the selection of a positioning system, and storing selected positioning system information; when it is determined that a first trigger condition for executing the synchronization of the positioning system information is met, synchronizing the stored positioning system information to the second processing unit; and the second processing unit executing positioning-related processing according to the obtained positioning system information.

7 Claims, 4 Drawing Sheets

(56) References Cited

FOREIGN PATENT DOCUMENTS

| CN | 105891861 | A |   | 8/2016  |        |           |
|----|-----------|---|---|---------|--------|-----------|
| CN | 105929426 | A |   | 9/2016  |        |           |
| CN | 107422355 | A |   | 12/2017 |        |           |
| CN | 206725978 | U |   | 12/2017 |        |           |
| CN | 109141425 | A |   | 1/2019  |        |           |
| CN | 208479811 | U |   | 2/2019  |        |           |
| CN | 110944286 | A | * | 3/2020  | ...... | G06F 9/4482 |
| JP | 9-200462  | A |   | 7/1997  |        |           |

* cited by examiner

DATA PROCESSING METHOD, APPARATUS AND SYSTEM, AND COMPUTER-READABLE STORAGE MEDIUM

CROSS REFERENCE TO RELATED APPLICATIONS

This application is a Continuation of PCT International Application No. PCT/CN2021/070715 filed on Jan. 7, 2021, which claims priority under 35 U.S.C. § 119(a) to patents application Nos. 202010550508.4; 202010549076.5; and 202010550309.3 filed in China on Jun. 16, 2020; Jun. 16, 2020; and Jun. 16, 2020, respectively, all of which are hereby expressly incorporated by reference into the present application.

BACKGROUND OF THE DISCLOSURE

1. Technical Field

The present disclosure relates to the technical field of wearable devices, and in particular to a data processing method, apparatus and system, and a computer-readable storage medium.

2. Description of Related Art

As smart watches, sports bracelets, and other wearable devices enter the lives of more people, there are higher requirements for the low power consumption and practicality of wearable devices. More practical functions are required, and power consumption is reduced. For example: at present, users of wearable devices, such as smart watches and sports bracelets, have relatively high requirements for the real-time positioning function, and desire that the positioning function does not generate relatively high power consumption. At present, however, when the positioning function is turned on in these smart wearable devices, especially in sports scenarios, the power consumption will be very high, which causes great inconvenience to the users and also affects the practicality of the wearable devices to some extent.

BRIEF SUMMARY OF THE DISCLOSURE

The embodiments of the present disclosure provide a data processing method, apparatus and system, and a computer-readable storage medium in an inventive manner in order to solve the above-mentioned problems during use of a wearable device.

According to a first aspect of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method includes: the first processing unit executing the selection of a positioning system, and storing selected positioning system information; when it is determined that a first trigger condition for executing the synchronization of the positioning system information is met, the first processing unit synchronizing the stored positioning system information to the second processing unit; and the second processing unit executing positioning-related processing according to the obtained positioning system information.

According to a second aspect of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method includes: the first processing unit obtaining positioning information of the first electronic device from the positioning system connected thereto and used to execute the positioning function, where the positioning information includes position information and time stamp information of the first electronic device within a certain time period; the first processing unit synchronizing the obtained positioning information to the second processing unit when it is determined that a first trigger condition for executing the synchronization of the positioning information is met; and the second processing unit executing positioning-related processing according to the obtained positioning information According to a third aspect of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method includes: the first processing unit obtaining positioning data of the first electronic device from the positioning system connected thereto and used to execute the positioning function; the first processing unit synchronizing the stored positioning system information to the second processing unit, when it is determined that a first trigger condition for executing the synchronization of the positioning system information is met; and the second processing unit executing positioning-related processing according to the obtained positioning data.

According to a fourth aspect of the present disclosure, there is provided a data processing apparatus, applied to a first electronic device, the first electronic device includes a first processing unit that runs a first operating system and a second processing unit that runs a second operating system, and the working energy consumption of the first processing unit is less than the working energy consumption of the second processing unit. The apparatus includes: a selection module, configured to the first processing unit for executing the selection of a positioning system and storing selected positioning system information; an information synchronization module, configured to the first processing unit for synchronizing the stored positioning system information to the second processing unit, when it is determined that a first trigger condition for executing the synchronization of the positioning system information is met; and an information processing module, configured to the second processing unit for executing positioning-related processing according to the obtained positioning system information.

According to a fifth aspect of the present disclosure, there is provided a data processing apparatus, applied to a first electronic device, the first electronic device includes a first processing unit that runs a first operating system and a second processing unit that runs a second operating system, and the working energy consumption of the first processing unit is less than the working energy consumption of the second processing unit. The apparatus includes: an information obtaining module, configured to the first processing unit for obtaining positioning information of the first electronic device from the positioning system, to which the first processing unit is connected, used to execute the positioning function, where the positioning information includes position information and time stamp information of the first electronic device within a certain time period; an information synchronization module, configured to the first processing unit for synchronizing the obtained positioning information to the second processing unit, when it is determined that a first trigger condition for executing the synchronization of the positioning information is met; and a data processing module, configured to the second processing unit for executing positioning-related processing according to the obtained positioning information.

According to a sixth aspect of the present disclosure, there is provided a data processing apparatus, applied to a first electronic device, the first electronic device includes a first processing unit that runs a first operating system and a second processing unit that runs a second operating system, and the working energy consumption of the first processing unit is less than the working energy consumption of the second processing unit. The apparatus includes: a positioning data obtaining module, configured to the first processing unit for obtaining positioning data of the first electronic device from the positioning system, to which the first processing unit is connected, used to execute the positioning function; a data synchronization module, configured to the first processing unit for synchronizing the obtained positioning data to the second processing unit, when it is determined that a first trigger condition for executing the synchronization of the positioning data is met; and a data processing module, configured to the second processing unit for executing positioning-related processing according to the obtained positioning data.

According to a seventh aspect of the present disclosure, there is further provided a data processing system, including a processor and a memory, where computer program instructions are stored in the memory, and when the computer program instructions are run by the processor, the data processing methods in the first aspect to the third aspect is implemented.

According to an eighth aspect of the present disclosure, there is further provided a computer-readable storage medium, including a set of computer-executable instructions, where when the instructions are executed, the data processing method in the first aspect to the third aspect is implemented.

The data processing method, apparatus and system, and the computer-readable storage medium in the embodiments of the present disclosure enable positioning data of dual operating systems of an electronic device to be independently stored, thereby ensuring that both dual systems can independently use the positioning data. When an operating system having relatively high energy consumption starts a positioning function, positioning information can be synchronized from an operating system having relatively low energy consumption, thereby avoiding the process of searching for and determining a satellite navigation system when the positioning system having relatively high energy consumption starts, effectively reducing the energy consumption of an electronic device, increasing the endurance of the electronic device, and further improving the user experience.

It should be understood that the teaching of the present disclosure does not need to achieve all of the beneficial effects described above, but specific technical solutions may achieve specific technical effects, and other implementations of the present disclosure can further achieve beneficial effects not mentioned above.

BRIEF DESCRIPTION OF THE SEVERAL VIEWS OF THE DRAWINGS

By reading the following detailed description with reference to the accompanying drawings, the above and other objectives, features and advantages of the exemplary embodiments of the present disclosure will become easier to understand. In the drawings, a number of embodiments of the present disclosure are shown in an exemplary and non-limiting manner, in which.

In the drawings, the same or corresponding reference numerals denote the same or corresponding parts.

DETAILED DESCRIPTION OF THE DISCLOSURE

The principle and spirit of the present disclosure will be described below with reference to a number of exemplary implementations. It should be understood that these implementations are provided merely to enable those skilled in the art to better understand and implement the present disclosure, and are not intended to limit the scope of the present disclosure in any way. On the contrary, these implementations are provided to enable the present disclosure to be more thorough and complete, and to enable the complete scope of the present disclosure to be communicated to those skilled in the art.

The technical solutions of the present disclosure are further described in detail below in conjunction with the accompanying drawings and the specific embodiments.

Embodiment 1

Figure 1:
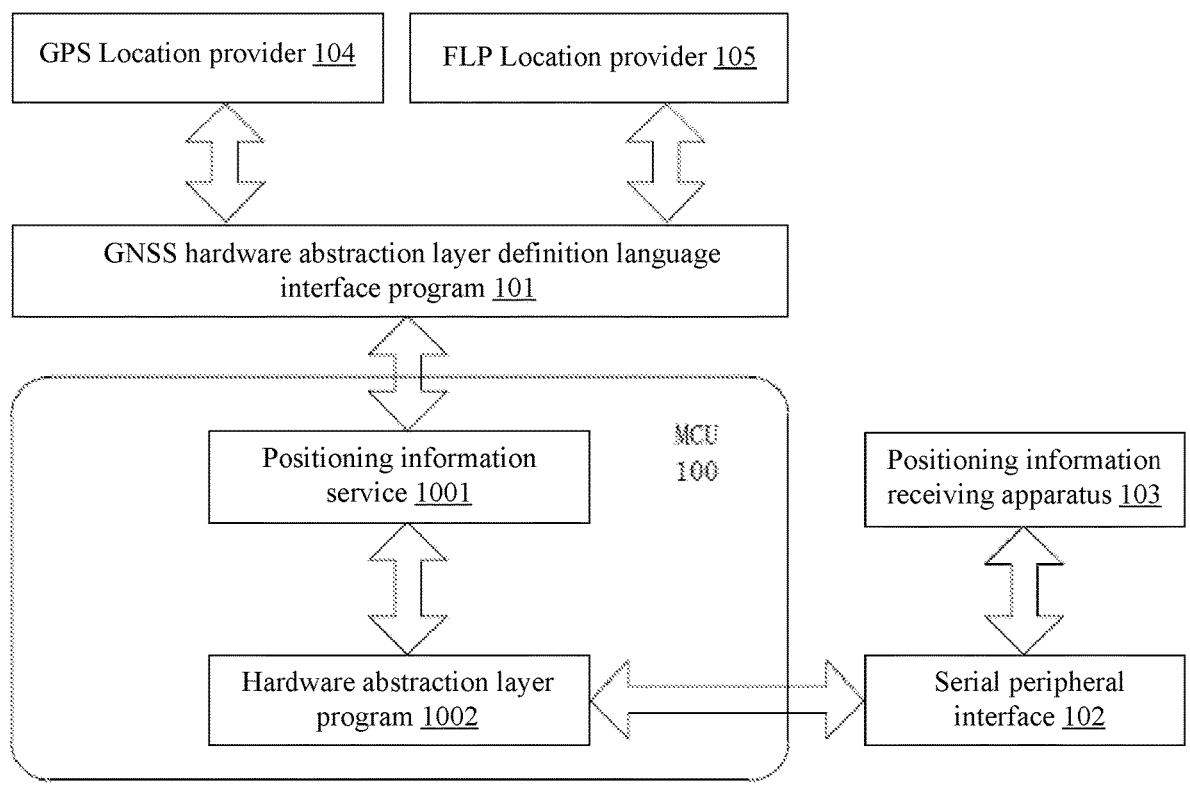
FIG. 1 is a schematic diagram of an application scenario of a data processing method according to an embodiment of the present disclosure.

FIG. 1 is a schematic diagram of an application scenario of a data processing method according to an embodiment of the present disclosure. A microcontroller unit (MCU) 100, at the hardware level, is in a circuit connection to a positioning information receiving apparatus 103 via a serial peripheral interface 102, and the positioning information receiving apparatus 103 may include a global positioning system (GPS) chip, e.g., BCM 4775X from Broadcom. There is an embedded operating system running on the MCU 100, such as: a real time operating system (RTOS), and the embedded operating system includes a positioning information service 1001. The positioning information service 1001 executes a data processing method according to an embodiment of the present disclosure. The positioning information service 1001 controls the positioning information receiving apparatus 103 through a hardware abstraction layer program 1002, including starting, initializing, reading operations, etc. The positioning information service 1001 may receive a program calling instruction, collect positioning data, and collate the positioning data to generate system-level positioning information and return the same to the calling program. The positioning information service 1001 may separately provide system positioning information, and may also provide positioning information for an intelligent operating system (e.g., android intelligent operating system), run by a central processing unit (CPU), and an application thereof through a global navigation satellite system hardware abstraction layer definition language interface program 101. The intelligent operating system and the application thereof may use a standard positioning location provider, such as a global positioning system (GPS) location provider 104 and a fused location positioning (FLP) location provider 105, provided by the intelligent operating system to obtain the required positioning information. However, the standard positioning location provider provided by the intelligent operating system may call the global navigation satellite system hardware abstraction layer definition language interface program 101 provided in the embodiment of the present disclosure to obtain application-level positioning information.

Figure 2:
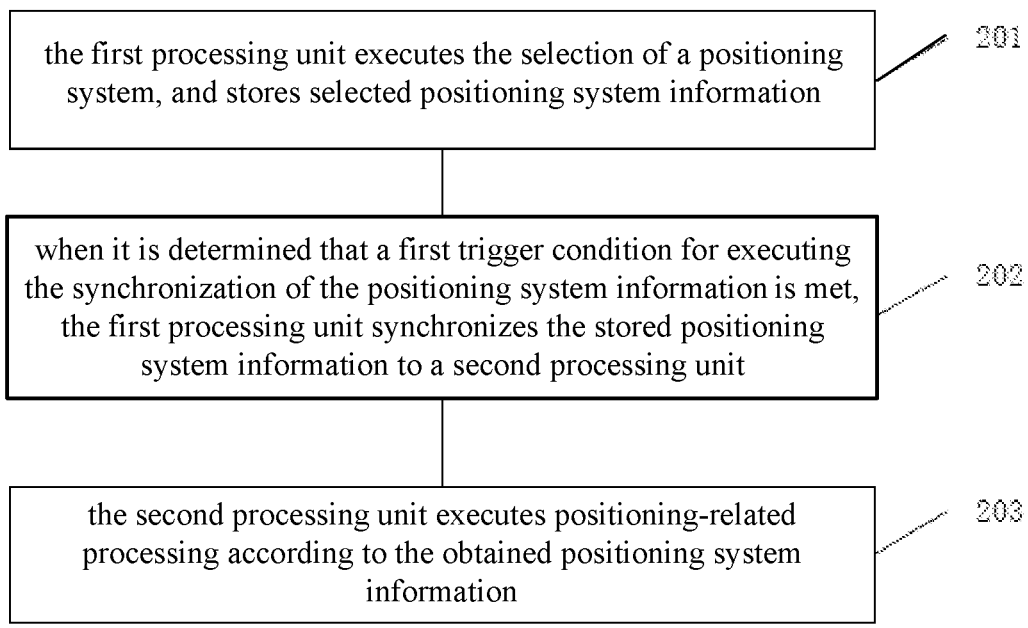
FIG. 2 is a schematic diagram of an implementation flow of a data processing method according to an embodiment of the present disclosure.

FIG. 2 is a schematic diagram of an implementation flow of a data processing method according to an embodiment of the present disclosure.

Referring to FIG. 2, according to an embodiment of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method at least includes the following operation flow: operation 201, the first processing unit executes the selection of a positioning system, and stores selected positioning system information; operation 202, when it is determined that a first trigger condition for executing the synchronization of the positioning system information is met, the first processing unit synchronizes the stored positioning system information to the second processing unit; and operation 203, the second processing unit executes positioning-related processing according to the obtained positioning system information.

In an embodiment of the present disclosure, the first electronic device is a wearable electronic device, the first processing unit is a microcontroller unit (MCU), and the second processing unit is a central processing unit (CPU).

In an embodiment of the present disclosure, the first operating system run by the first processing unit is a real time operating system (RTOS), and the second operating system run by the second processing unit is an intelligent operating system, for example: an Android system. The working energy consumption of the MCU running the RTOS is less than that of the CPU running Android.

For example, the first electronic device is a smart watch including the MCU running the RTOS and the CPU running the Android system.

It should be noted that, if not particularly noted, in the process of illustrating various operation steps herein, in order to more intuitively describe solutions of the embodiments of the present disclosure, the solutions of the embodiments of the present disclosure are explained by taking that the first electronic device is a smart watch, the first processing unit is an MCU running a RTOS, and the second processing unit is a CPU running an Android system as an example. Certainly, according to the embodiments of the present disclosure, the first electronic device is not limited to the smart watch, the first processing unit is not limited to the MCU, the second processing unit is not limited to the CPU, the first operating system is not limited to the RTOS, and the second operating system is not limited to Android.

In operation 201, the first processing unit executes the selection of a positioning system, and stores selected positioning system information.

In an embodiment of the present disclosure, the first processing unit supports communication connections with a plurality of positioning systems, and the first processing unit executes the selection of the positioning system in the following manner: the first processing unit obtaining the signal strength corresponding to the plurality of positioning systems and selecting the positioning system having the highest signal strength therefrom; and determining the selected positioning system as a corresponding positioning system used by the first processing unit to execute a positioning function, to control a positioning module corresponding to the selected positioning system in the first processing unit to be in a working state and a positioning module corresponding to a non-selected positioning system to be in a non-working state.

For example, the positioning system may include: a BeiDou Navigation Satellite System (BDS), a Global Positioning System (GPS), a Global Navigation Satellite System (GLONASS), and a Galileo Satellite Navigation System. The MCU obtains the signal strength corresponding to the plurality of positioning systems, and selects the positioning system having the highest signal strength therefrom, for example: in a certain area, the BDS is a positioning system having the highest signal strength among the plurality of positioning systems, then the MCU determines a corresponding positioning system using the BDS to execute a positioning function, and controls a positioning module corresponding to the BDS in the MCU to be in a working state, and controls positioning modules corresponding to the GPS, GLONASS and Galileo satellite navigation system in the MCU to all be adjusted to be in a non-working state.

The MCU selects one positioning system from the plurality of positioning systems, mainly in order to adjust the positioning modules in the MCU corresponding to other non-selected positioning systems to be in a non-working state, thereby saving energy consumption and extending the endurance time of the smart watch. Connection delay caused by the MCU frequently switching between the plurality of positioning systems may further be avoided, because normally, it takes a long time for a positioning module, running on a system such as a smart watch, a mobile phone, and a vehicle-mounted navigation system, to establish a connection to a satellite positioning system, and this time can be intuitively perceived by people, for example: a time of around one minute.

In an implementation of the present disclosure, a positioning module running in the first processing unit selects a positioning system having the highest signal strength from a plurality of positioning systems through a satellite searching process in a working state, and stores positioning system information of the selected positioning system.

In an implementation of the present disclosure, after the positioning system having the highest strength is selected, the signal strength corresponding to the positioning system having the highest strength is further compared with a first threshold; when the signal strength corresponding to the positioning system having the highest strength is greater than or equal to the first threshold, the positioning system having the highest strength is determined as the selected positioning system; and when the signal strength corresponding to the positioning system having the highest strength is less than the first threshold, a second electronic device, having a positioning function, to which the first electronic device is connected, is determined as the selected positioning system.

In an implementation of the present disclosure, the second electronic device is an intelligent terminal, for example: a mobile phone, a tablet computer, etc.

It should be noted that, if not particularly noted, in the process of illustrating various operation steps herein, in order to more intuitively describe solutions of the embodiments of the present disclosure, the solutions of the embodiments of the present disclosure are explained by taking that the second electronic device is an intelligent terminal as an example.

For example, the first threshold may be signal strength set as actually required to ensure that the positioning module running in the MCU can communicate with the positioning system relatively quickly. The MCU selects the positioning system BDS having the highest signal strength among the positioning systems such as BDS, GPS, GLONASS, and Galileo satellite navigation system. The signal strength corresponding to the BDS is compared with the first threshold, and if the signal strength corresponding to the BDS is greater than the first threshold, then it is indicated that effective communication can be performed between the positioning module, running in the MCU, and the BDS, thereby ensuring that the positioning module running in the MCU normally obtains positioning data from the positioning system. In this case, the BDS is determined as the selected positioning system.

If the signal strength corresponding to the BDS is less than the first threshold, then it is indicated that effective communication cannot be performed between the positioning module, running in the MCU, and the plurality of positioning systems, thereby not ensuring that the positioning module running in the MCU normally obtains positioning data from the positioning system. In this case, the MCU may be selected to communicate with the intelligent terminal, and satellite data can be synchronized from the intelligent terminal. For example: the MCU may communicate with the intelligent terminal through Bluetooth Low Energy (BLE).

In an implementation of the present disclosure, when the signal strength corresponding to the positioning system having the highest strength is less than the first threshold, and the signal strength between the second electronic device and the positioning system to which the second electronic device is in communication connection is also less than the first threshold, it is indicated that the first processing unit cannot normally obtains the positioning information of the positioning system through the second electronic device. In this case, the first processing unit may re-execute the selection operation of the positioning system.

For example, the signal strength between the positioning module running in the MCU and the plurality of positioning systems is less than the first threshold, and in this case, the MCU attempts to be connected to the intelligent terminal through the BLE, so as to synchronize positioning information from the intelligent terminal. However, when it is obtained that the signal strength between the intelligent terminal and the positioning system BDS to which the intelligent terminal is communicatively connected is also less than the first threshold, the MCU may attempt to be connected to the plurality of positioning systems again, until successfully connected to one of the positioning systems.

In an embodiment of the present disclosure, a second electronic device, having a positioning function, to which the first electronic device is connected, is determined as the selected position system by means of the following specific operation: obtaining signal strength between the second electronic device and the positioning system in communication connection therewith, and when the signal strength is greater than or equal to the first threshold, determining the second electronic device, having the positioning function, to which the first electronic device is connected, as the selected positioning system of the first processing unit.

For example, among the MCU and positioning systems such as BDS, GPS, GLONASS and Galileo satellite positioning system, the one having the highest signal strength is BDS. The signal strength between the MCU and the BDS is X, and X is less than the first threshold. And the signal strength of the communication between the MCU and the intelligent terminal is Y, and the communication between the MCU and the intelligent terminal can be performed through the BLE. Y is greater than the first threshold, then the MCU may be selected to communicate with the intelligent terminal, and satellite data can be synchronized from the intelligent terminal.

In an embodiment of the present disclosure, after the selected positioning system is determined as the corresponding positioning system used by the first processing unit to execute the positioning function, the signal strength of the first processing unit and the corresponding positioning system currently used to execute the positioning function is also obtained, and the obtained signal strength is compared with a second threshold; when the obtained signal strength is less than the second threshold, current signal strength, corresponding to the plurality of positioning systems, obtained by the first processing unit, is reobtained and the positioning system having the highest current signal strength is selected therefrom; when the signal strength corresponding to the positioning system having the highest current signal strength is greater than or equal to the first threshold, the positioning system having the highest current signal strength is determined as a new selected positioning system; if the new selected positioning system and the current positioning system used to execute the positioning function are not the same positioning system, the positioning system used to execute the positioning function is switched to the new selected system; where the second threshold is the same as or different from the first threshold.

For example, the MCU determines that the positioning system having the highest signal strength among the MCU and the plurality of positioning systems is the BDS when the MCU execute the selection operation of the positioning system last time. The signal strength between the MCU and the BDS is X, and X is greater than the first threshold. After the BDS is selected as the corresponding positioning system currently used by the first processing unit to execute the positioning function, the MCU would obtain the current signal strength Y of the communication between the selected positioning system BDS and the MCU again, so as to confirm that the current signal strength of the communication between the selected positioning system BDS and the MCU can still ensure the normal communication between the MCU and the BDS. Specifically, the second threshold may be set to lowest signal strength that ensures normal communication between the positioning module of the first processing unit and the positioning system, and if the positioning module of the first processing unit cannot normally communicate with the positioning system, the first processing unit cannot normally obtain positioning data from the positioning system.

In operation 202, when it is determined that a first trigger condition for executing the synchronization of the positioning system information is met, the first processing unit synchronizes the stored positioning system information to a second processing unit.

In an implementation of the present disclosure, the first trigger condition may be at least one of the following: the second processing unit starting and entering a working state; the first processing unit obtaining a positioning data synchronization instruction sent by the second processing unit; and the second processing unit starting a positioning-related application.

For example, the intelligent operating system, running on the CPU, has relatively high energy consumption in a working state, and therefore, in this embodiment of the present disclosure, a general application in the first electronic device is operated based on the RTOS system running on the MCU. The RTOS running on the MCU and the intelligent operating system running on the CPU separately store positioning data thereof. In order to ensure that the intelligent operating system running on the CPU can quickly start or quickly turn on the positioning function, when the CPU enters the working state from the off state or the CPU enters the working state from the hibernation state, for example: press the power button, click the smart watch display apparatus, enter the intelligent operating system from the system switch setting of the RTOS, etc., the MCU synchronizes the positioning system information stored in operation 201 to the CPU.

The intelligent operating system running on the CPU may further request to synchronize the positioning data from the MCU side when the positioning function needs to be turned on, for example: keys are turned on by the positioning function, including a virtual key and a physical key. The MCU may be further triggered to send the stored positioning system information to the CPU when the application which needs positioning data in the CPU starts. For example: navigation, map application, or the like running in the CPU.

In an implementation of the present disclosure, the positioning system information includes a positioning system selected by the MCU, for example: one of BDS, GPS, GLONASS, and Galileo Satellite Positioning System. In this way, when entering a working state or turning on a positioning function, the CPU can directly communicate with the determined selected positioning system according to the positioning system information obtained from the MCU, so as to avoid the problems of relatively high energy consumption and positioning function start delay generated or brought by repeatedly executing operations such as satellite searching to determine which positioning system is selected.

In an implementation of the present disclosure, the positioning system information may further include parameters such as GGA and UTC obtained during the ephemeris, where the GGA refers to the positioning system positioning data and has a standard data specification. For example, $ GPGGA, <1>, <2>, <3>, <4>, <5>, <6>, <7>, <8>, <9>, M, <10>, M, <11>, <12>*xx<CR><LF>, where: $ GPGGA: a starting guide and a statement format description (the sentence is GPS positioning data);

the <1> field is used to describe the UTC in the format hhmmss.sss;

the <2> field is used to describe the latitude in the format ddmm.mmmm (the first bit being zero will also be transmitted);

the <3> field is used to describe the latitude hemisphere, N or S (north or south latitude);

the <4> field is used to describe the longitude in the format dddmm.mmmm (the first bit being zero will also be transmitted);

the <5> field is used to describe the longitude hemisphere, E or W (east or west longitude);

the <6> field is used to describe the positioning quality indication, 0=positioning invalid, 1=positioning valid;

the <7> field is used to describe the number of satellites used, from 00 to 12 (the first zero will also be transmitted);

the <8> field is used to describe horizontal accuracy, from 0.5 to 99.9;

the <9> field is used to describe the height of the antenna from sea level, from −9999.9 to 9999.9 meters, and M refers to the unit of meter;

the <10> field is used to describe the geoid height, from −9999.9 to 9999.9 meters, and M refers to the unit of meter;

the <11> field is used to describe the differential GPS data deadline (RTCMSC-104), and the number of seconds is finally set for RTCM transmission;

The <12> field is used to describe the differential reference base station number, from 0000 to 1023 (the first zero will also be transmitted).

The unit of sea level height and geoid height in fields <9> and <10> is meter.

Coordinated Universal Time (UTC) is also known as Universal Uniform Time, Universal Standard Time, and International Coordinated Time. Due to the different abbreviations, CUT in English and TUC in French, as a compromise, UTC is called for short. CNS 7648 Data elements and interchange formats—Information interchange—Representation of dates and times is referred to as Universal Uniform Time. UTC uses the format of hhmmss (hours, minutes, seconds).

In this way, the CPU may use the satellite-to-ephemeris data obtained from the MCU synchronized by the MCU, so that the intelligent operating system running on the CPU can implement quick positioning, and based on effectively shortening the Time to First Fix (TTFF) and implementing the quick starting of the CPU, the communication time of communication with the satellite in the positioning system to obtain the current positioning data is effectively reduced, thereby further improving the user experience. For example: the current position may be quickly positioned.

In an implementation of the present disclosure, the positioning system information may further include position information and time stamp information of the first electronic device within a certain time period.

In operation 203, the second processing unit executes positioning-related processing according to the obtained positioning system information.

In an implementation of the present disclosure, the positioning system information includes a positioning system selected by the MCU, and the second processing unit executes positioning operation according to the obtained positioning system information. In this way, when entering a working state or turning on a positioning function, the CPU can directly communicate with the determined selected positioning system according to the positioning system information obtained from the MCU, so as to obtain information such as current position and avoid the problems of relatively high energy consumption and positioning function start delay generated or brought by repeatedly executing operations such as satellite searching to determine which positioning system is selected.

In an implementation of the present disclosure, the positioning system information may further include parameters such as GGA and UTC obtained during the ephemeris. The second processing unit implements quick positioning according to the obtained positioning system information.

In an implementation of the present disclosure, the positioning system information may further include position information and time stamp information of the first electronic device within a certain time period. The second processing unit may execute positioning system information processing according to the obtained positioning system information.

For example, after the intelligent operating system running on the CPU enters the working state or starts the positioning function, position information, time stamp and other data in positioning system information may be directly obtained synchronously from the MCU, for example: from a set time before the CPU starting time to the CPU starting time, position information of the first electronic device determined by the MCU and time stamp information corresponding thereto, such as: longitude, latitude, and time stamp information corresponding to the latitude and longitude. According to the above-mentioned positioning system information, the CPU can use a corresponding application to perform timeliness positioning information processing, for example: drawing a movement route diagram within a set time period.

In this way, the integrity and timeliness of the positioning system information of the CPU can be ensured, thereby avoiding that the intelligent operating system running on the CPU cannot obtain the positioning information during the period of CPU hibernation or shutdown, and ensuring that the application which needs to use the position information having time stamp information to analyze positioning data may be used normally.

The data processing method, apparatus and system, and the computer-readable storage medium in the embodiments of the present disclosure enable positioning data of dual operating systems of an electronic device to be independently stored, thereby ensuring that both dual systems can independently use the positioning data. When an operating system having relatively high energy consumption starts a positioning function, positioning information can be synchronized from an operating system having relatively low energy consumption, thereby avoiding the process of searching for and determining a satellite navigation system when the positioning system having relatively high energy consumption starts, effectively reducing the energy consumption of an electronic device, increasing the endurance of the electronic device, and further improving the user experience.

Similarly, based on the forgoing data processing method, according to an embodiment of the present disclosure, there is further provided a computer-readable storage medium having a program stored thereon, and when the program is executed by a processor, the processor at least implements the following operation steps: operation 201, the first processing unit executes the selection of a positioning system, and stores selected positioning system information; operation 202, when it is determined that a first trigger condition for executing the synchronization of the positioning system information is met, the first processing unit synchronizes the stored positioning system information to the second processing unit; and operation 203, the second processing unit executes positioning-related processing according to the obtained positioning system information.

Further, based on the forgoing data processing method, according to an embodiment of the present disclosure, there is further provided a data processing system, including a processor and a memory, where computer program instructions are stored in the memory, and when the computer program instructions are run by the processor, the forgoing data processing method is implemented.

Figure 3:
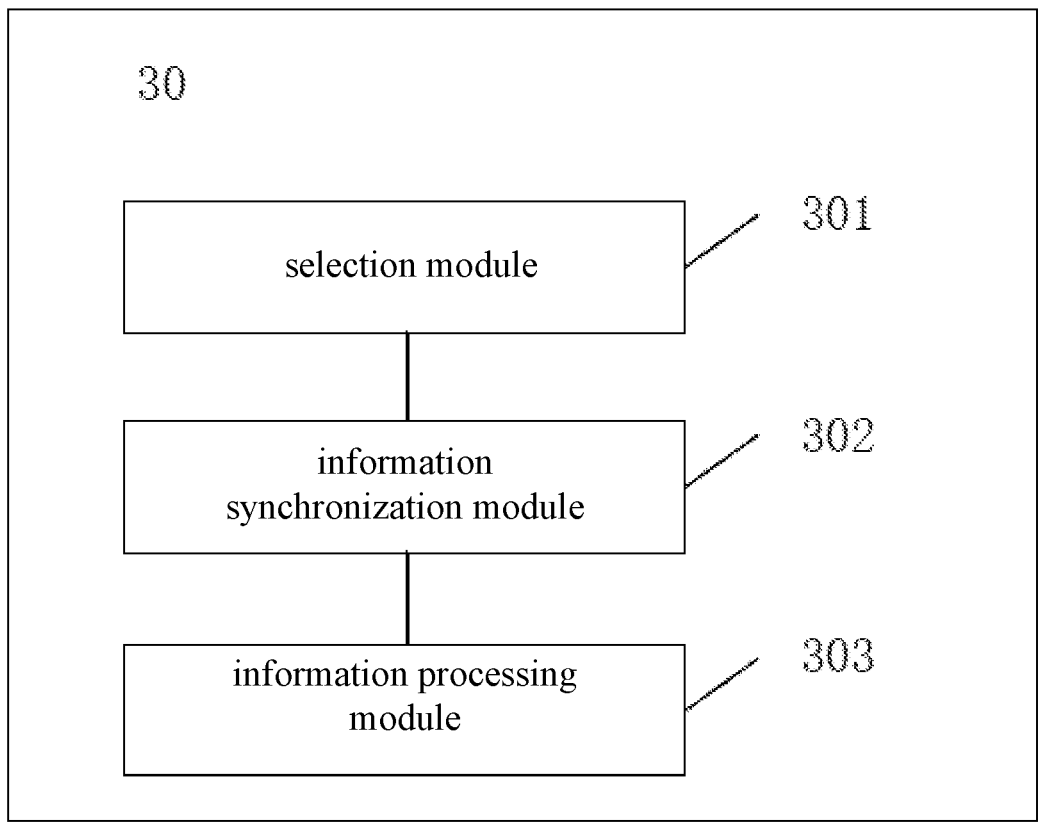
FIG. 3 is a schematic diagram of a constitutional structure of a data processing apparatus according to an embodiment of the present disclosure.

More further, based on the forgoing data processing method, according to an embodiment of the present disclosure, there is further provided a data processing apparatus, applied to a first electronic device, where the first electronic device includes a first processing unit that runs a first operating system and a second processing unit that runs a second operating system, and the working energy consumption of the first processing unit is less than the working energy consumption of the second processing unit. FIG. 3 is a schematic diagram of a constitutional structure of a data processing apparatus according to an embodiment of the present disclosure. Referring to FIG. 3, the apparatus 30 includes: a selection module 301, configured to the first processing unit for executing the selection of a positioning system and storing selected positioning system information; an information synchronization module 302, configured to the first processing unit for synchronizing the stored positioning system information to the second processing unit, when it is determined that a first trigger condition for executing the synchronization of the positioning system information is met; and an information processing module 303, configured to the second processing unit for executing positioning-related processing according to the obtained positioning system information.

In an implementation of the present disclosure, the first processing unit supports communication connections with a plurality of positioning systems; and the selection module 301 includes: a strength determination submodule, configured to the first processing unit for obtaining the signal strength corresponding to the plurality of positioning systems and selecting the positioning system having the highest signal strength therefrom; and a state control submodule, configured to determine the selected positioning system as a corresponding positioning system used by the first processing unit to execute a positioning function, to control a positioning module corresponding to the selected positioning system in the first processing unit to be in a working state and a positioning module corresponding to a non-selected positioning system to be in a non-working state.

It should be noted here that: the above description of the embodiment of the data processing apparatus is similar to the foregoing description of the method embodiments shown in the FIGS. 1 and 2, and has similar beneficial effects to the foregoing method embodiments shown in the FIGS. 1 and 2, and therefore details are not described herein again. Reference is made to the foregoing description of method embodiments, shown in FIGS. 1 and 2, of the present disclosure for technical details which are not disclosed in the embodiments of data processing apparatus of the present disclosure, and therefore details are not described herein again to save space.

Embodiment 2

FIG. 1 is a schematic diagram of an application scenario of a data processing method according to an embodiment of the present disclosure. A microcontroller unit (MCU) 100, at the hardware level, is in a circuit connection to a positioning information receiving apparatus 103 via a serial peripheral interface 102, and the positioning information receiving apparatus 103 may include a global positioning system (GPS) chip, e.g., BCM 4775X from Broadcom. There is an embedded operating system running on the MCU 100, such as: a real time operating system (RTOS), and the embedded operating system includes a positioning information service 1001. The positioning information service 1001 executes a data processing method according to an embodiment of the present disclosure. The positioning information service 1001 controls the positioning information receiving apparatus 103 through a hardware abstraction layer program 1002, including starting, initializing, reading operations, etc. The positioning information service 1001 may receive a program calling instruction, collect positioning information, and collate the positioning information to generate system-level positioning information and return the same to the calling program. The positioning information service 1001 may separately provide system positioning information, and may also provide positioning information for an intelligent operating system (e.g., android intelligent operating system), run by a central processing unit (CPU), and an application thereof through a global navigation satellite system hardware abstraction layer definition language interface program 101. The intelligent operating system and the application thereof may use a standard positioning location provider, such as a global positioning system (GPS) location provider 104 and a fused location positioning (FLP) location provider 105, provided by the intelligent operating system to obtain the required positioning information. However, the standard positioning location provider provided by the intelligent operating system may call the global navigation satellite system hardware abstraction layer definition language interface program 101 provided in the embodiment of the present disclosure to obtain application-level positioning information.

Figure 4:
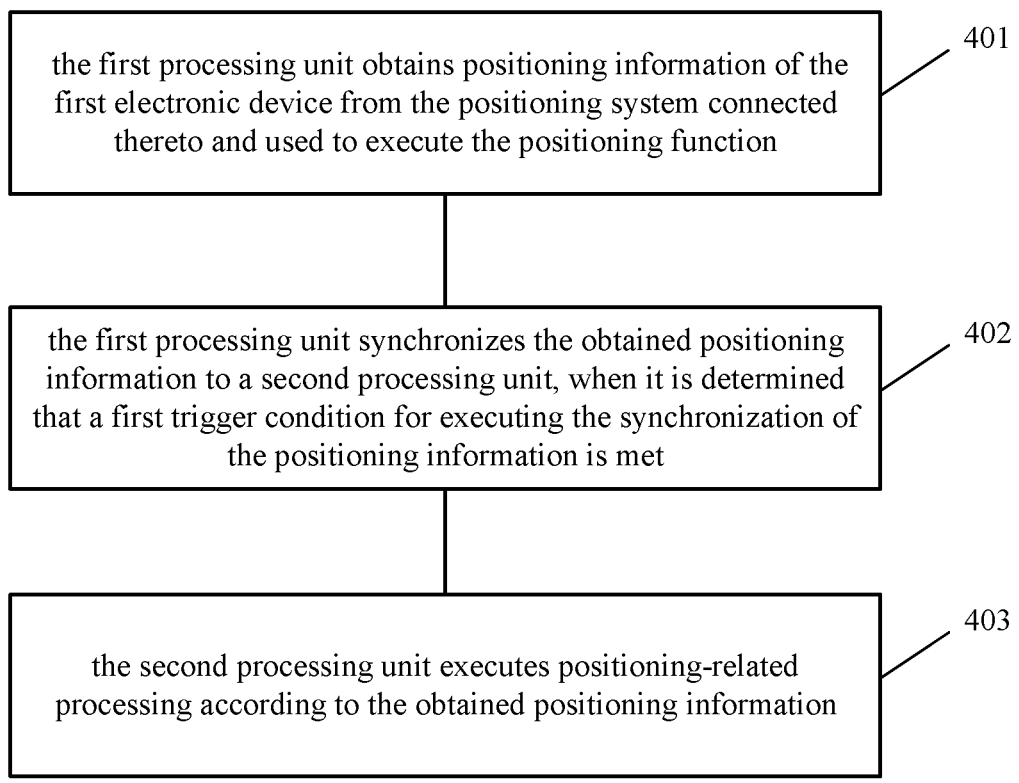
FIG. 4 is a schematic diagram of another implementation flow of a data processing method according to an embodiment of the present disclosure.

FIG. 4 is a schematic diagram of an implementation flow of a data processing method according to an embodiment of the present disclosure.

Referring to FIG. 4, according to an embodiment of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method at least includes the following operation flow: operation 401, the first processing unit obtains positioning information of the first electronic device from the positioning system connected thereto and used to execute the positioning function, where the positioning information includes position information and time stamp information of the first electronic device within a certain time period; operation 402, the first processing unit synchronizes the obtained positioning information to the second processing unit, when it is determined that a first trigger condition for executing the synchronization of the positioning information is met; and operation 403, the second processing unit executes positioning-related processing according to the obtained positioning information.

In operation 401, the first processing unit obtains positioning information of the first electronic device from the positioning system connected thereto and used to execute the positioning function, where the positioning information includes position information and time stamp information of the first electronic device within a certain time period.

In an embodiment of the present disclosure, the first electronic device is a wearable electronic device, the first processing unit is a microcontroller unit (MCU), and the second processing unit is a central processing unit (CPU).

In an embodiment of the present disclosure, the first operating system run by the first processing unit is a real time operating system (RTOS), and the second operating system run by the second processing unit is an intelligent operating system, for example: an Android system. The working energy consumption of the MCU running the RTOS is less than that of the CPU running Android.

For example, the first electronic device is a smart watch including the MCU running the RTOS and the CPU running the Android system.

It should be noted that, if not particularly noted, in the process of illustrating various operation steps herein, in order to more intuitively describe solutions of the embodiments of the present disclosure, the solutions of the embodiments of the present disclosure are explained by taking that the first electronic device is a smart watch, the first processing unit is an MCU running a RTOS, and the second processing unit is a CPU running an Android system as an example. Certainly, according to the embodiments of the present disclosure, the first electronic device is not limited to the smart watch, the first processing unit is not limited to the MCU, the second processing unit is not limited to the CPU, the first operating system is not limited to the RTOS, and the second operating system is not limited to Android.

In an embodiment of the present disclosure, the first processing unit only supports a communication connection with one positioning system, for example: one of a BeiDou Navigation Satellite System (BDS), a Global Positioning System (GPS), a Global Navigation Satellite System (GLONASS), and a Galileo Satellite Navigation System. The first processing unit may further be communicatively connected to only a second electronic device having a positioning function, and uses the second electronic device as a positioning system. For example: an intelligent terminal such as a mobile phone and a tablet computer having a positioning function. The first processing unit may then obtain positioning information directly from the positioning system connected thereto, without judging which positioning system to communicated with.

In an embodiment of the present disclosure, the first processing unit supports communication connections with a plurality of positioning systems. For example: the first processing unit can be communicatively connected to two or more of BDS, GPS, GLONASS, Galileo satellite navigation system, or the second electronic device having the positioning function. In this case, the positioning system selected by the first processing unit needs to be determined first and the first processing unit communicates with the selected positioning system to obtain positioning information from the positioning system.

The specific form and content of the positioning information obtained by the first processing unit will be described in detail in operation 402 and details are not described herein again.

In an embodiment of the present disclosure, the first processing unit selects a positioning system used to execute the positioning function in the following manner: the first processing unit obtaining the signal strength corresponding to the plurality of positioning systems and selecting the positioning system having the highest signal strength therefrom; determining the selected positioning system as a corresponding positioning system used by the first processing unit to execute a positioning function, to control a positioning module corresponding to the selected positioning system in the first processing unit to be in a working state and a positioning module corresponding to a non-selected positioning system to be in a non-working state.

For example, the positioning system may include: a BDS, a GPS, a GLONASS, and a Galileo satellite navigation system. The MCU obtains the signal strength corresponding to the plurality of positioning systems, and selects the positioning system having the highest signal strength therefrom, for example: in a certain area, the BDS is a positioning system having the highest signal strength among the plurality of positioning systems, then the MCU determines a corresponding positioning system using the BDS to execute a positioning function, and controls a positioning module corresponding to the BDS in the MCU to be in a working state, and controls positioning modules corresponding to the GPS, GLONASS and Galileo satellite navigation system in the MCU to all be adjusted to be in a non-working state.

The MCU selects one positioning system from the plurality of positioning systems, mainly in order to adjust the positioning modules in the MCU corresponding to other non-selected positioning systems to be in a non-working state, thereby saving energy consumption and extending the endurance time of the smart watch. Connection delay caused by the MCU frequently switching between the plurality of positioning systems may further be avoided, because normally, it takes a long time for a positioning module, running on a system such as a smart watch, a mobile phone, and a vehicle-mounted navigation system, to establish a connection to a satellite positioning system, and this time can be intuitively perceived by people, for example: a time of around one minute.

In an implementation of the present disclosure, a positioning module running in the first processing unit in a working state selects a positioning system having the highest signal strength from a plurality of positioning systems through a satellite searching process.

In an implementation of the present disclosure, after the positioning system having the highest strength is selected, the signal strength corresponding to the positioning system having the highest strength is further compared with a first threshold; when the signal strength corresponding to the positioning system having the highest strength is greater than or equal to the first threshold, the positioning system having the highest strength is determined as the selected positioning system; and when the signal strength corresponding to the positioning system having the highest strength is less than the first threshold, a second electronic device, having a positioning function, to which the first electronic device is connected, is determined as the selected positioning system.

In an implementation of the present disclosure, the second electronic device is an intelligent terminal, for example: a mobile phone, a tablet computer, etc.

It should be noted that, if not particularly noted, in the process of illustrating various operation steps herein, in order to more intuitively describe solutions of the embodiments of the present disclosure, the solutions of the embodiments of the present disclosure are explained by taking that the second electronic device is an intelligent terminal as an example. Certainly, the second electronic device is not limited to the intelligent terminal.

For example, the first threshold may be signal strength set as actually required to ensure that the positioning module running in the MCU can communicate with the positioning system relatively quickly. The MCU selects the positioning system BDS having the highest signal strength among the positioning systems such as BDS, GPS, GLONASS, and Galileo satellite navigation system. The signal strength corresponding to the BDS is compared with the first threshold, and if the signal strength corresponding to the BDS is greater than the first threshold, then it is indicated that effective communication can be performed between the positioning module, running in the MCU, and the BDS, thereby ensuring that the positioning module running in the MCU normally obtains positioning information from the positioning system. In this case, the BDS is determined as the selected positioning system.

If the signal strength corresponding to the BDS is less than the first threshold, then it is indicated that effective communication cannot be performed between the positioning module, running in the MCU, and the plurality of positioning systems, thereby not ensuring that the positioning module running in the MCU normally obtains positioning information from the positioning system. In this case, the MCU may be selected to communicate with the intelligent terminal, and satellite data can be synchronized from the intelligent terminal. For example: the MCU may communicate with the intelligent terminal through Bluetooth Low Energy (BLE).

In an implementation of the present disclosure, when the signal strength corresponding to the positioning system having the highest strength is less than the first threshold, and the signal strength between the second electronic device and the positioning system to which the second electronic device is in communication connection is also less than the first threshold, it is indicated that the first processing unit cannot normally obtains the positioning information of the positioning system through the second electronic device. In this case, the first processing unit may re-execute the selection operation of the positioning system.

For example, the signal strength between the positioning module running in the MCU and the plurality of positioning systems is less than the first threshold, and in this case, the MCU attempts to be connected to the intelligent terminal through the BLE, so as to synchronize positioning information from the intelligent terminal. However, when it is obtained that the signal strength between the intelligent terminal and the positioning system BDS to which the intelligent terminal is communicatively connected is also less than the first threshold, the MCU may attempt to be connected to the plurality of positioning systems again, until successfully connected to one of the positioning systems.

In an embodiment of the present disclosure, a second electronic device, having a positioning function, to which the first electronic device is connected, is determined as the selected position system by means of the following specific operation: obtaining signal strength between the second electronic device and the positioning system in communication connection therewith, and when the signal strength is greater than or equal to the first threshold, determining the second electronic device, having the positioning function, to which the first electronic device is connected, as the selected positioning system of the first processing unit.

For example, among the MCU and positioning systems such as BDS, GPS, GLONASS and Galileo satellite positioning system, the one having the highest signal strength is BDS. The signal strength between the MCU and the BDS is X, and X is less than the first threshold. And the signal strength of the communication between the MCU and the intelligent terminal is Y, and the communication between the MCU and the intelligent terminal can be performed through the BLE. Y is greater than the first threshold, then the MCU may be selected to communicate with the intelligent terminal, and satellite data can be synchronized from the intelligent terminal.

In an embodiment of the present disclosure, after the selected positioning system is determined as the corresponding positioning system used by the first processing unit to execute the positioning function, the signal strength of the first processing unit and the corresponding positioning system currently used to execute the positioning function is also obtained, and the obtained signal strength is compared with a second threshold; when the obtained signal strength is less than the second threshold, current signal strength, corresponding to the plurality of positioning systems, obtained by the first processing unit, is reobtained and the positioning system having the highest current signal strength is selected therefrom; when the signal strength corresponding to the positioning system having the highest current signal strength is greater than or equal to the first threshold, the positioning system having the highest current signal strength is determined as a new selected positioning system; if the new selected positioning system and the current positioning system used to execute the positioning function are not the same positioning system, the positioning system used to execute the positioning function is switched to the new selected system; where the second threshold is the same as or different from the first threshold.

For example, the MCU determines that the positioning system having the highest signal strength among the MCU and the plurality of positioning systems is the BDS when the MCU execute the selection operation of the positioning system last time. The signal strength between the MCU and the BDS is X, and X is greater than the first threshold. After the BDS is selected as the corresponding positioning system currently used by the first processing unit to execute the positioning function, the MCU would obtain the current signal strength Y of the communication between the selected positioning system BDS and the MCU again, so as to confirm that the current signal strength of the communication between the selected positioning system BDS and the MCU can still ensure the normal communication between the MCU and the BDS. Specifically, the second threshold may be set to lowest signal strength that ensures normal communication between the positioning module of the first processing unit and the positioning system, and if the positioning module of the first processing unit cannot normally communicate with the positioning system, the first processing unit cannot normally obtain positioning information from the positioning system.

In an implementation of the present disclosure, the positioning information includes position information and time stamp information of the first electronic device within a certain time period.

In an implementation of the present disclosure, the first processing unit obtains positioning information of the first electronic device from the positioning system connected thereto and used to execute the positioning function, and stores the obtained positioning information for a set time, for example: storing for one year, half year, one month, ten days, one week, etc. In this way, when the second processing unit synchronizes the positioning information from the first processing unit, the positioning information within a certain time period may be selected for synchronization, and the positioning-related processing is executed according to the synchronized positioning information.

In operation 402, the first processing unit synchronizes the obtained positioning information to a second processing unit, when it is determined that a first trigger condition for executing the synchronization of the positioning information is met.

In an implementation of the present disclosure, position information and time stamp information within a certain time period may include position information and time stamp information of the first electronic device within a set time period at and before the moment when the second electronic device turns on the positioning function, switches from the hibernation state to the working state or turns on the power. Position information and time stamp information within a certain time period may further be the time period information carried in the positioning information synchronization instruction sent by the second processing unit.

For example, when the CPU is powered on or switched from a hibernation state to a working state, the MCU may default to synchronize positioning information within a set time period before the moment when the CPU is powered on or switched to a working state to the CPU. An application of the CPU may be started, for example: exercise and health, the positioning information of the smart watch between a first moment and a second moment obtained by the MCU is needed to draw a movement route diagram, and a certain time period refers to a time period between the first moment and the second moment. The first moment is earlier than the second moment, and the second moment may be the moment when the MCU turns on the positioning function at the CPU, switches from the hibernation state to the working state or turns on the power, or may be a moment before the first electronic device turns on the positioning function at the CPU, switches from the hibernation state to the working state or turns on the power.

In an implementation of the present disclosure, the first trigger condition may be at least one of the following: the second processing unit starting and entering a working state; the first processing unit obtaining a positioning information synchronization instruction sent by the second processing unit; and the second processing unit starting a positioning-related application.

For example, the intelligent operating system, running on the CPU, has relatively high energy consumption in a working state, and therefore, in this embodiment of the present disclosure, a general application in the first electronic device is operated based on the RTOS system running on the MCU. The RTOS running on the MCU and the intelligent operating system running on the CPU separately store positioning information thereof. In order to ensure that the intelligent operating system running on the CPU can quickly start or quickly turn on the positioning function, when the CPU enters the working state from the off state or the CPU enters the working state from the hibernation state, for example: press the power button, click the smart watch display apparatus, enter the intelligent operating system from the system switch setting of the RTOS, etc., the MCU synchronizes the positioning system information of the first electronic device obtained in operation 401 to the CPU.

The intelligent operating system running on the CPU may further request to synchronize the positioning information from the MCU side when the positioning function needs to be turned on, for example: keys are turned on by the positioning function, including a virtual key and a physical key. The MCU may be further triggered to send the stored positioning system information to the CPU when the application which needs positioning information in the CPU starts. For example: navigation, map application, or the like running in the CPU.

In operation 403, the second processing unit executes positioning-related processing according to the obtained positioning information.

In an implementation of the present disclosure, the second processing unit executing positioning-related processing according to the obtained positioning information may be direct utilization of positioning information such as display of position information and corresponding time stamp information, and may also be analysis processing of the position information and corresponding time stamp information.

For example, applications such as Exercise and Health, and Map in a smart watch can execute functions such as drawing a movement trajectory diagram, calculating the number of kilometers of movement in a set time period, calculating the movement duration in a set time period, and analyzing the movement speed in a set time period according to the position information and time stamp information synchronized by the CPU from the MCU. The position information at a certain moment may also be determined for viewing according to the position information and time stamp information.

In an implementation of the present disclosure, after the first processing unit synchronizes the obtained positioning information to the second processing unit, when it is determined that a second trigger condition for stopping the synchronization of the positioning information is met, the first processing unit stops synchronizing the obtained positioning information to the second processing unit. The second trigger condition is at least one of the following: the second processing unit entering a non-working state; the first processing unit obtaining an instruction, for stopping synchronizing positioning information, sent by the second processing unit; and a positioning-related application not being included in the applications run by the second processing unit.

In an implementation of the present disclosure, the first processing unit stops synchronizing the obtained positioning information to the second processing unit, where the obtained positioning information refers to the current position information in the positioning information obtained by the first processing unit.

For example, when the CPU is switched from the hibernation state to the working state, the MCU synchronizes positioning information obtained by the MCU between the moment when the state of CPU is switched and 10 minutes before the moment to the CPU, where the positioning information includes position information and time stamp information within the 10 minutes. When the CPU turns off the positioning function or the application related to the positioning function, the MCU has synchronized the positioning information obtained by the MCU between the moment when the state of CPU is switched and 10 minutes before the moment to the CPU. In this case, the MCU stops synchronizing the positioning information to the CPU, which is actually stopping synchronizing the current position information of the smart watch.

For example, the intelligent operating system running on the CPU is in a working state, the energy consumption is relatively high, and at the same time, the energy consumption of the positioning module running in the CPU is also relatively high; however, in order to ensure that the intelligent operating system running on the CPU can have relatively good user experience, the optimal opportunity of turning on and off the positioning module of the CPU is set by comprehensively considering the battery endurance parameters, the current power of the first electronic device, the demand and the use frequency of the user of the first electronic device for the positioning function, the power consumption of the positioning module in the CPU in the set time and other factors. Therefore, the first trigger condition for the first processing unit to synchronize the obtained positioning information to the second processing unit and the second trigger condition for the first processing unit to stop synchronizing the obtained positioning information to the second processing unit may both be set as required.

In an implementation of the present disclosure, regardless of the first trigger condition triggering the first processing unit to synchronize the obtained positioning information to the second processing unit, the first processing unit stops synchronizing the obtained positioning information to the second processing unit when the second processing unit enters the non-working state. For example: it is determined, through the power-off key of the smart watch, that the CPU enters the non-working state, including off state and hibernation state. The power-off key may be a virtual key or a physical key, and may further be the same key as the power-on key.

In an implementation of the present disclosure, the first processing unit stops synchronizing the obtained positioning information to the second processing unit as long as one of the following is met: the first processing unit is in the case where the second processing unit enters a non-working state; the first processing unit obtains an instruction, for stopping synchronizing positioning information, sent by the second processing unit; and a positioning-related application is not included in the applications run by the second processing unit.

For example, after the MCU synchronizes the positioning information to the CPU, it can be detected within a set time whether the CPU runs a positioning-related application, and if not, the synchronization of the obtained positioning information to the second processing unit is stopped. For example: turning off applications running in CPU like Navigation or Map.

In an implementation of the present disclosure, the first processing unit being able to obtain an instruction, for stopping synchronizing positioning information, sent by the second processing unit includes: the second processing unit detecting that a positioning-related application is accidentally run in the background of the current first electronic device, for example: Exercise and Health, etc., selecting to turn off a corresponding application, and sending an instruction for stopping synchronizing positioning information to the first processing unit while clicking a key to turn off the application.

In an implementation of the present disclosure, the second processing unit sends an instruction for stopping synchronizing positioning information to the first processing unit when the second processing unit itself establishes a communication connection to the selected positioning system or determines that the communication with the selected positioning system is smooth.

For example, when the MCU synchronizes the obtained positioning information to the CPU, the synchronization will be repeated, and information for detecting whether the synchronization is successful is sent to the CPU until the CPU returns the information of successful synchronization, and the synchronization of the positioning information is stopped; and the MCU and the CPU respectively control their positioning modules, and receive the positioning information sent by the respective selected positioning systems.

It should be noted that the operation that the first processing unit stops synchronizing the obtained positioning information to the second processing unit may be executed before the operation 403 is completed, or may be executed when the operation 403 is not processed or partially completed, and the operation that the first processing unit synchronizes the obtained positioning information to the second processing unit can be stopped as long as it is determined that a second trigger condition for stopping the synchronization of the positioning information is met.

In this way, according to the data processing method, apparatus, and system, and the computer-readable storage medium in the embodiments of the present disclosure, when it is determined that the first trigger condition for executing the synchronization of positioning information is met, the first processing unit synchronizes the obtained positioning information to the second processing unit so that the second processing unit executes positioning-related processing according to the obtained positioning information, where the positioning information includes position information and time stamp information of the first electronic device within a certain time period. The problem that, after the second processing unit restarts or switches to the working state and executes the positioning function, the positioning information during the shutdown or hibernation of the second processing unit cannot be obtained, can be effectively avoided. A time-related positioning function is executed by implementing quick obtaining of time-related positioning information.

Similarly, based on the forgoing data processing method, according to an embodiment of the present disclosure, there is further provided a computer-readable storage medium having a program stored thereon, and when the program is executed by a processor, the processor at least implements the following operation steps: operation 401, the first processing unit obtains positioning information of the first electronic device from the positioning system connected thereto and used to execute the positioning function, where the positioning information includes position information and time stamp information of the first electronic device within a certain time period; operation 402, the first processing unit synchronizes the obtained positioning information to the second processing unit, when it is determined that a first trigger condition for executing the synchronization of the positioning information is met; and operation 403, the second processing unit executes positioning-related processing according to the obtained positioning information.

Further, based on the forgoing data processing method, according to an embodiment of the present disclosure, there is further provided a data processing system, including a processor and a memory, where computer program instructions are stored in the memory, and when the computer program instructions are run by the processor, the forgoing data processing method is implemented.

Figure 5:
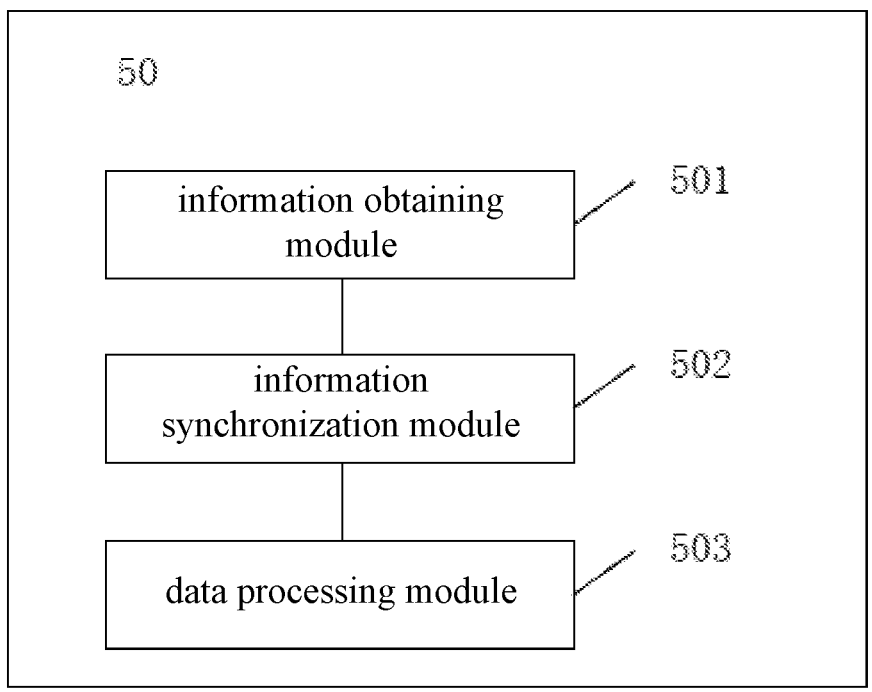
FIG. 5 is a schematic diagram of another constitutional structure of a data processing apparatus according to an embodiment of the present disclosure.

More further, based on the forgoing data processing method, according to an embodiment of the present disclosure, there is further provided a data processing apparatus, applied to a first electronic device, where the first electronic device includes a first processing unit that runs a first operating system and a second processing unit that runs a second operating system, and the working energy consumption of the first processing unit is less than the working energy consumption of the second processing unit. FIG. 5 is a schematic diagram of another constitutional structure of a data processing apparatus 50 according to an embodiment of the present disclosure. As shown in FIG. 5, the apparatus 50 includes: an information obtaining module 501, configured to the first processing unit for obtaining positioning information of the first electronic device from the positioning system, to which the first processing unit is connected, used to execute the positioning function, where the positioning information includes position information and time stamp information of the first electronic device within a certain time period; an information synchronization module 502, configured to the first processing unit for synchronizing the obtained positioning information to the second processing unit, when it is determined that a first trigger condition for executing the synchronization of the positioning information is met; and a data processing module 503, configured to the second processing unit for executing positioning-related processing according to the obtained positioning information.

In an implementation of the present disclosure, the first trigger condition is at least one of the following: the second processing unit starting and entering a working state; the first processing unit obtaining a positioning information synchronization instruction sent by the second processing unit; and the second processing unit starting an application in a first list, where the application in the first list needs to use the positioning information application during running.

In an implementation of the present disclosure, the apparatus 50 further includes: a data stopping module, configured to, after the first processing unit synchronizes the obtained positioning information to the second processing unit, when it is determined that a second trigger condition for stopping the synchronization of the positioning information is met, the first processing unit for stopping synchronizing the obtained positioning information to the second processing unit; where the second trigger condition is at least one of the following: the second processing unit entering a non-working state; the first processing unit obtaining an instruction, for stopping synchronizing positioning information, sent by the second processing unit; and an application in the first list not being included in the applications run by the second processing unit.

It should be noted here that: the above description of the embodiment of the data processing apparatus and system is similar to the foregoing description of the method embodiments shown in the FIGS. 1 and 4, and has similar beneficial effects to the foregoing method embodiments shown in the FIGS. 1 and 4, and therefore details are not described herein again. Reference is made to the foregoing description of method embodiments, shown in FIGS. 1 and 4, of the present disclosure for technical details which are not disclosed in the embodiments of data processing apparatus and system of the present disclosure, and therefore details are not described herein again to save space.

Embodiment 3

FIG. 1 is a schematic diagram of an application scenario of a data processing method according to an embodiment of the present disclosure. A microcontroller unit (MCU) 100, at the hardware level, is in a circuit connection to a positioning information receiving apparatus 103 via a serial peripheral interface 102, and the positioning information receiving apparatus 103 may include a global positioning system (GPS) chip, e.g., BCM 4775X from Broadcom. There is an embedded operating system running on the MCU 100, such as: a real time operating system (RTOS), and the embedded operating system includes a positioning information service 1001. The positioning information service 1001 executes a data processing method according to an embodiment of the present disclosure. The positioning information service 1001 controls the positioning information receiving apparatus 103 through a hardware abstraction layer program 1002, including starting, initializing, reading operations, etc. The positioning information service 1001 may receive a program calling instruction, collect positioning data, and collate the positioning data to generate system-level positioning information and return the same to the calling program. The positioning information service 1001 may separately provide system positioning information, and may also provide positioning information for an intelligent operating system (e.g., android intelligent operating system), run by a central processing unit (CPU), and an application thereof through a global navigation satellite system hardware abstraction layer definition language interface program 101. The intelligent operating system and the application thereof may use a standard positioning location provider, such as a global positioning system (GPS) location provider 104 and a fused location positioning (FLP) location provider 105, provided by the intelligent operating system to obtain the required positioning information. However, the standard positioning location provider provided by the intelligent operating system may call the global navigation satellite system hardware abstraction layer definition language interface program 101 provided in the embodiment of the present disclosure to obtain application-level positioning information.

Figure 6:
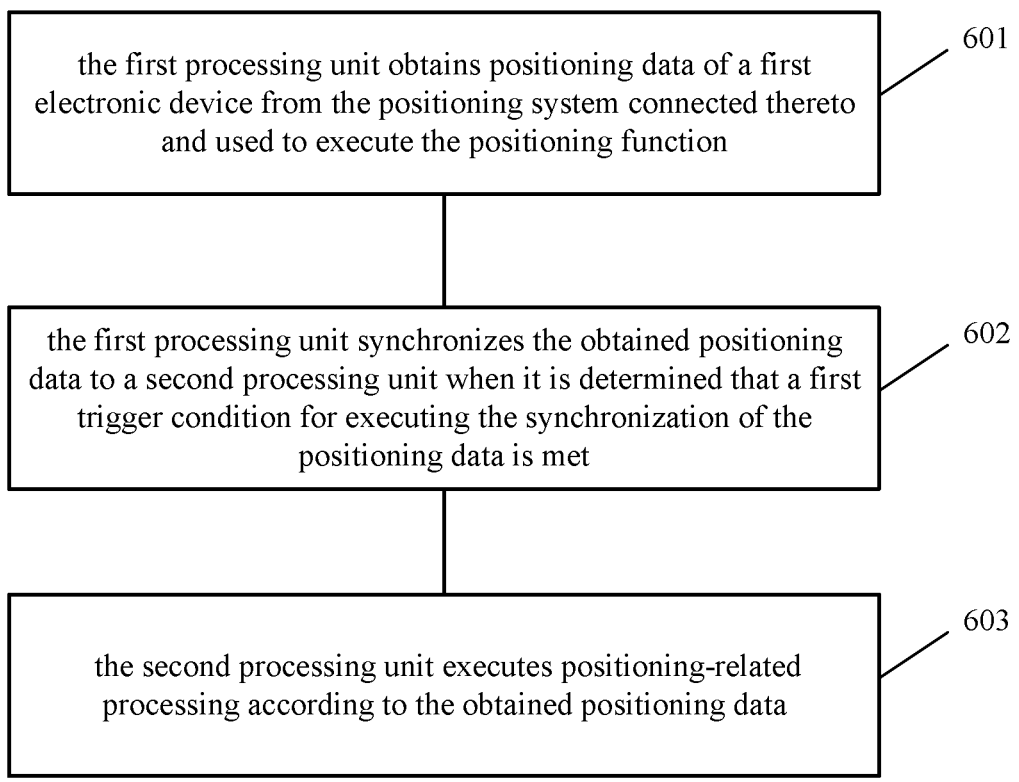
FIG. 6 is a schematic diagram of another implementation flow of a data processing method according to an embodiment of the present disclosure.

FIG. 6 is a schematic diagram of an implementation flow of a data processing method according to an embodiment of the present disclosure.

Referring to FIG. 6, according to an embodiment of the present disclosure, there is provided a data processing method, applied to a first electronic device, the first electronic device includes a first processing unit that runs a first operating system and a second processing unit that runs a second operating system, and the working energy consumption of the first processing unit is less than the working energy consumption of the second processing unit. The method at least includes the following operation flow: operation 601, the first processing unit obtains positioning data of the first electronic device from the positioning system connected thereto and used to execute the positioning function; operation 602, the first processing unit synchronizes the obtained positioning data to the second processing unit, when it is determined that a first trigger condition for executing the synchronization of the positioning data is met; and operation 603, the second processing unit executes positioning-related processing according to the obtained positioning data.

In operation 601, the first processing unit obtains positioning data of a first electronic device from the positioning system connected thereto and used to execute the positioning function.

In an embodiment of the present disclosure, the first electronic device is a wearable electronic device, the first processing unit is a microcontroller unit (MCU), and the second processing unit is a central processing unit (CPU).

In an embodiment of the present disclosure, the first operating system run by the first processing unit is a real time operating system (RTOS), and the second operating system run by the second processing unit is an intelligent operating system, for example: an Android system. The working energy consumption of the MCU running the RTOS is less than that of the CPU running Android.

For example, the first electronic device is a smart watch including the MCU running the RTOS and the CPU running the Android system.

It should be noted that, if not particularly noted, in the process of illustrating various operation steps herein, in order to more intuitively describe solutions of the embodiments of the present disclosure, the solutions of the embodiments of the present disclosure are explained by taking that the first electronic device is a smart watch, the first processing unit is an MCU running a RTOS, and the second processing unit is a CPU running an Android system as an example. Certainly, according to the embodiments of the present disclosure, the first electronic device is not limited to the smart watch, the first processing unit is not limited to the MCU, the second processing unit is not limited to the CPU, the first operating system is not limited to the RTOS, and the second operating system is not limited to Android.

In an embodiment of the present disclosure, the first processing unit only supports a communication connection with one positioning system, for example: one of a BeiDou Navigation Satellite System (BDS), a Global Positioning System (GPS), a Global Navigation Satellite System (GLONASS), and a Galileo Satellite Navigation System. The first processing unit may further be communicatively connected to only a second electronic device having a positioning function, and uses the second electronic device as a positioning system. For example: an intelligent terminal such as a mobile phone and a tablet computer having a positioning function. The first processing unit may then obtain positioning data directly from the positioning system connected thereto, without judging which positioning system to communicated with.

In an embodiment of the present disclosure, the first processing unit supports communication connections with a plurality of positioning systems. For example: the first processing unit can be communicatively connected to two or more of BDS, GPS, GLONASS, Galileo satellite navigation system, or the second electronic device having the positioning function. In this case, the positioning system selected by the first processing unit needs to be determined first and the first processing unit communicates with the selected positioning system to obtain positioning data from the positioning system.

In an embodiment of the present disclosure, the first processing unit selects a positioning system used to execute the positioning function in the following manner: the first processing unit obtaining the signal strength corresponding to the plurality of positioning systems and selecting the positioning system having the highest signal strength therefrom; determining the selected positioning system as a corresponding positioning system used by the first processing unit to execute a positioning function, to control a positioning module corresponding to the selected positioning system in the first processing unit to be in a working state and a positioning module corresponding to a non-selected positioning system to be in a non-working state.

For example, the positioning system may include: a BDS, a GPS, a GLONASS, and a Galileo satellite navigation system. The MCU obtains the signal strength corresponding to the plurality of positioning systems, and selects the positioning system having the highest signal strength therefrom, for example: in a certain area, the BDS is a positioning system having the highest signal strength among the plurality of positioning systems, then the MCU determines a corresponding positioning system using the BDS to execute a positioning function, and controls a positioning module corresponding to the BDS in the MCU to be in a working state, and controls positioning modules corresponding to the GPS, GLONASS and Galileo satellite navigation system in the MCU to all be adjusted to be in a non-working state.

The MCU selects one positioning system from the plurality of positioning systems, mainly in order to adjust the positioning modules in the MCU corresponding to other non-selected positioning systems to be in a non-working state, thereby saving energy consumption and extending the endurance time of the smart watch. Connection delay caused by the MCU frequently switching between the plurality of positioning systems may further be avoided, because normally, it takes a long time for a positioning module, running on a system such as a smart watch, a mobile phone, and a vehicle-mounted navigation system, to establish a connection to a satellite positioning system, and this time can be intuitively perceived by people, for example: a time of around one minute.

In an implementation of the present disclosure, a positioning module running in the first processing unit in a working state selects a positioning system having the highest signal strength from a plurality of positioning systems through a satellite searching process.

In an implementation of the present disclosure, after the positioning system having the highest strength is selected, the signal strength corresponding to the positioning system having the highest strength is further compared with a first threshold; when the signal strength corresponding to the positioning system having the highest strength is greater than or equal to the first threshold, the positioning system having the highest strength is determined as the selected positioning system; and when the signal strength corresponding to the positioning system having the highest strength is less than the first threshold, a second electronic device, having a positioning function, to which the first electronic device is connected, is determined as the selected positioning system.

In an implementation of the present disclosure, the second electronic device is an intelligent terminal, for example: a mobile phone, a tablet computer, etc.

It should be noted that, if not particularly noted, in the process of illustrating various operation steps herein, in order to more intuitively describe solutions of the embodiments of the present disclosure, the solutions of the embodiments of the present disclosure are explained by taking that the second electronic device is an intelligent terminal as an example. Certainly, the second electronic device is not limited to the intelligent terminal.

For example, the first threshold may be signal strength set as actually required to ensure that the positioning module running in the MCU can communicate with the positioning system relatively quickly. The MCU selects the positioning system BDS having the highest signal strength among the positioning systems such as BDS, GPS, GLONASS, and Galileo satellite navigation system. The signal strength corresponding to the BDS is compared with the first threshold, and if the signal strength corresponding to the BDS is greater than the first threshold, then it is indicated that effective communication can be performed between the positioning module, running in the MCU, and the BDS, thereby ensuring that the positioning module running in the MCU normally obtains positioning data from the positioning system. In this case, the BDS is determined as the selected positioning system.

If the signal strength corresponding to the BDS is less than the first threshold, then it is indicated that effective communication cannot be performed between the positioning module, running in the MCU, and the plurality of positioning systems, thereby not ensuring that the positioning module running in the MCU normally obtains positioning data from the positioning system. In this case, the MCU may be selected to communicate with the intelligent terminal, and satellite data can be synchronized from the intelligent terminal. For example: the MCU may communicate with the intelligent terminal through Bluetooth Low Energy (BLE).

In an implementation of the present disclosure, when the signal strength corresponding to the positioning system having the highest strength is less than the first threshold, and the signal strength between the second electronic device and the positioning system to which the second electronic device is in communication connection is also less than the first threshold, it is indicated that the first processing unit cannot normally obtains the positioning information of the positioning system through the second electronic device. In this case, the first processing unit may re-execute the selection operation of the positioning system.

For example, the signal strength between the positioning module running in the MCU and the plurality of positioning systems is less than the first threshold, and in this case, the MCU attempts to be connected to the intelligent terminal through the BLE, so as to synchronize positioning information from the intelligent terminal. However, when it is obtained that the signal strength between the intelligent terminal and the positioning system BDS to which the intelligent terminal is communicatively connected is also less than the first threshold, the MCU may attempt to be connected to the plurality of positioning systems again, until successfully connected to one of the positioning systems.

In an embodiment of the present disclosure, a second electronic device, having a positioning function, to which the first electronic device is connected, is determined as the selected position system by means of the following specific operation: obtaining signal strength between the second electronic device and the positioning system in communication connection therewith, and when the signal strength is greater than or equal to the first threshold, determining the second electronic device, having the positioning function, to which the first electronic device is connected, as the selected positioning system of the first processing unit.

For example, among the MCU and positioning systems such as BDS, GPS, GLONASS and Galileo satellite positioning system, the one having the highest signal strength is BDS. The signal strength between the MCU and the BDS is X, and X is less than the first threshold. And the signal strength of the communication between the MCU and the intelligent terminal is Y, and the communication between the MCU and the intelligent terminal can be performed through the BLE. Y is greater than the first threshold, then the MCU may be selected to communicate with the intelligent terminal, and satellite data can be synchronized from the intelligent terminal.

In an embodiment of the present disclosure, after the selected positioning system is determined as the corresponding positioning system used by the first processing unit to execute the positioning function, the signal strength of the first processing unit and the corresponding positioning system currently used to execute the positioning function is also obtained, and the obtained signal strength is compared with a second threshold; when the obtained signal strength is less than the second threshold, current signal strength, corresponding to the plurality of positioning systems, obtained by the first processing unit, is reobtained and the positioning system having the highest current signal strength is selected therefrom; when the signal strength corresponding to the positioning system having the highest current signal strength is greater than or equal to the first threshold, the positioning system having the highest current signal strength is determined as a new selected positioning system; if the new selected positioning system and the current positioning system used to execute the positioning function are not the same positioning system, the positioning system used to execute the positioning function is switched to the new selected system; where the second threshold is the same as or different from the first threshold.

For example, the MCU determines that the positioning system having the highest signal strength among the MCU and the plurality of positioning systems is the BDS when the MCU execute the selection operation of the positioning system last time. The signal strength between the MCU and the BDS is X, and X is greater than the first threshold. After the BDS is selected as the corresponding positioning system currently used by the first processing unit to execute the positioning function, the MCU would obtain the current signal strength Y of the communication between the selected positioning system BDS and the MCU again, so as to confirm that the current signal strength of the communication between the selected positioning system BDS and the MCU can still ensure the normal communication between the MCU and the BDS. Specifically, the second threshold may be set to lowest signal strength that ensures normal communication between the positioning module of the first processing unit and the positioning system, and if the positioning module of the first processing unit cannot normally communicate with the positioning system, the first processing unit cannot normally obtain positioning data from the positioning system.

In an implementation of the present disclosure, the first processing unit obtains positioning data of the first electronic device from the positioning system connected thereto and used to execute the positioning function in the following manner: the parameters such as GGA and UTC obtained in the process of ephemeris executed by the positioning module of the first processing unit.

The GGA refers to positioning system positioning data, and has a standard data specification. For example, $ GPGGA, <1>, <2>, <3>, <4>, <5>, <6>, <7>, <8>, <9>, M, <10>, M, <11>, <12>*xx<CR><LF>, where: $ GPGGA: a starting guide and a statement format description (the sentence is GPS positioning data);

the <1> field is used to describe the UTC in the format hhmmss.sss;

the <2> field is used to describe the latitude in the format ddmm.mmmm (the first bit being zero will also be transmitted);

the <3> field is used to describe the latitude hemisphere, N or S (north or south latitude);

the <4> field is used to describe the longitude in the format dddmm.mmmm (the first bit being zero will also be transmitted);

the <5> field is used to describe the longitude hemisphere, E or W (east or west longitude);

the <6> field is used to describe the positioning quality indication, 0=positioning invalid, 1=positioning valid;

the <7> field is used to describe the number of satellites used, from 00 to 12 (the first zero will also be transmitted);

the <8> field is used to describe horizontal accuracy, from 0.5 to 99.9;

the <9> field is used to describe the height of the antenna from sea level, from −9999.9 to 9999.9 meters, and M refers to the unit of meter;

the <10> field is used to describe the geoid height, from −9999.9 to 9999.9 meters, and M refers to the unit of meter;

the <11> field is used to describe the differential GPS data deadline (RTCMSC-104), and the number of seconds is finally set for RTCM transmission;

The <12> field is used to describe the differential reference base station number, from 0000 to 1023 (the first zero will also be transmitted).

The unit of sea level height and geoid height in fields <9> and <10> is meter.

Coordinated Universal Time (UTC) is also known as Universal Uniform Time, Universal Standard Time, and International Coordinated Time. Due to the different abbreviations, CUT in English and TUC in French, as a compromise, UTC is called for short. CNS 7648 Data elements and interchange formats—Information interchange—Representation of dates and times is referred to as Universal Uniform Time. UTC uses the format of hhmmss (hours, minutes, seconds).

In an implementation of the present disclosure, the first processing unit obtaining positioning data from the positioning system connected thereto and having the positioning function, includes obtaining the current position information in real time.

In operation 602, the first processing unit synchronizes the obtained positioning data to a second processing unit when it is determined that a first trigger condition for executing the synchronization of the positioning data is met.

In an implementation of the present disclosure, the first trigger condition may be at least one of the following: the second processing unit starting and entering a working state; the first processing unit obtaining a positioning data synchronization instruction sent by the second processing unit; and the second processing unit starting a positioning-related application.

For example, the intelligent operating system, running on the CPU, has relatively high energy consumption in a working state, and therefore, in this embodiment of the present disclosure, a general application in the first electronic device is operated based on the RTOS system running on the MCU. The RTOS running on the MCU and the intelligent operating system running on the CPU separately store positioning data thereof. In order to ensure that the intelligent operating system running on the CPU can quickly start or quickly turn on the positioning function, when the CPU enters the working state from the off state or the CPU enters the working state from the hibernation state, for example: press the power button, click the smart watch display apparatus, enter the intelligent operating system from the system switch setting of the RTOS, etc., the MCU synchronizes the positioning data of the first electronic device obtained in operation 601 to the CPU.

The intelligent operating system running on the CPU may further request to synchronize the positioning data from the MCU side when the positioning function needs to be turned on, for example: keys are turned on by the positioning function, including a virtual key and a physical key. The MCU may be further triggered to send the stored positioning data to the CPU when the application which needs positioning data in the CPU starts, for example: applications such as Weather, Map, and Exercise and Health running in the CPU.

In an implementation of the present disclosure, the first processing unit synchronizes the positioning data such as GGA and UTC in the obtained positioning data to the second processing unit.

For example, the MCU communicates with its selected positioning system BDS, obtains positioning data such as GGA and UTC through ephemeris, and when the CPU is switched from hibernation state to working state, synchronizes the positioning data to the CPU. In this way, the CPU may use the satellite-to-ephemeris data obtained from the MCU synchronized by the MCU, so that the intelligent operating system running on the CPU can implement quick positioning, and based on effectively shortening the Time to First Fix (TTFF) and implementing the quick starting of the CPU, the communication time of communication with the satellite in the positioning system to obtain the current positioning data is effectively reduced, thereby further improving the user experience. For example: the current position may be quickly positioned.

In anther implementation of the present disclosure, the first processing unit synchronizes the current position information in the obtained positioning data to the second processing unit. In this way, the second processing unit may execute the processing related to the position information directly according to the current position information based on a quick start.

For example, the MCU obtains the current position information from the selected positioning system BDS, when an application Weather of the CPU is started, the MCU synchronizes the current position information to the CPU, and the CPU can determine weather information corresponding to the current position information according to the current position information synchronized from the MCU, and display the same.

In operation 603, the second processing unit executes positioning-related processing according to the obtained positioning data.

In an implementation of the present disclosure, the positioning data may include parameters such as GGA and UTC obtained during the ephemeris. The second processing unit implements quick positioning according to the obtained positioning data.

For example, the application Weather of the second processing unit opens and displays the weather information of the current position based on the current position information. In this case, the second processing unit may synchronize the current position information directly from the first processing unit and display weather information corresponding to the current position information according to the current position information.

For example: by pressing the physical power key of the smart watch, the Android system running on the CPU is started and the homepage of the system displays the current time and the weather information corresponding to the current position. In this case, the CPU obtains positioning data such as GGA and UTC of the positioning system and the current position information from the MCU, and starts the positioning module running in the CPU according to the positioning data, while quickly displaying the weather information corresponding to the current position according to the current position.

In an implementation of the present disclosure, after the first processing unit synchronizes the obtained positioning data to the second processing unit, when it is determined that a second trigger condition for stopping the synchronization of the positioning data is met, the first processing unit stops synchronizing the obtained positioning data to the second processing unit. The second trigger condition is at least one of the following: the second processing unit entering a non-working state; the first processing unit obtaining an instruction, for stopping synchronizing positioning data, sent by the second processing unit; and a positioning-related application not being included in the applications run by the second processing unit.

In an implementation of the present disclosure, the intelligent operating system running on the CPU is in a working state, the energy consumption is relatively high, and at the same time, the energy consumption of the positioning module running in the CPU is also relatively high; however, in order to ensure that the intelligent operating system running on the CPU can have relatively good user experience, the optimal opportunity of turning on and off the positioning module of the CPU is set by comprehensively considering the battery endurance parameters, the current power of the first electronic device, the demand and the use frequency of the user of the first electronic device for the positioning function, the power consumption of the positioning module in the CPU in the set time and other factors. Therefore, the first trigger condition for the first processing unit to synchronize the obtained positioning data to the second processing unit and the second trigger condition for the first processing unit to stop synchronizing the obtained positioning data to the second processing unit may both be set as required.

In an implementation of the present disclosure, regardless of how the first trigger condition and the second trigger condition are determined, after the first processing unit stops synchronizing the positioning data to the second processing unit, the first processing unit may continue to obtain and store the positioning data of the first electronic device from the positioning system connected thereto and used to execute the positioning function. In this case, the positioning function of the second processing unit is turned off or a positioning module of the second processing unit itself is used to communicate with the positioning system connected thereto and having the positioning function, so as to obtain positioning data.

In an implementation of the present disclosure, the first processing unit stopping synchronizing the positioning data to the second processing unit may includes stopping synchronizing the current position information to the second processing unit. In an implementation of the present disclosure, regardless of the first trigger condition triggering the first processing unit to synchronize the obtained positioning data to the second processing unit, the first processing unit stops synchronizing the obtained positioning data to the second processing unit when the second processing unit enters the non-working state. For example: it is determined, through the power-off key of the smart watch, that the CPU enters the non-working state, including off state and hibernation state. The power-off key may be a virtual key or a physical key, and may further be the same key as the power-on key.

In an implementation of the present disclosure, the first processing unit stops synchronizing the obtained positioning data to the second processing unit as long as one of the following is met: the first processing unit is in the case where the second processing unit enters a non-working state; the first processing unit obtains an instruction, for stopping synchronizing positioning data, sent by the second processing unit; and a positioning-related application is not included in the applications run by the second processing unit. For example, after the MCU synchronizes the positioning data to the CPU, it can be detected within a set time whether the CPU runs a positioning-related application, and if not, the synchronization of the obtained positioning data to the second processing unit is stopped. For example: turning off applications running in CPU like Navigation or Map.

In an implementation of the present disclosure, the first processing unit being able to obtain an instruction, for stopping synchronizing positioning data, sent by the second processing unit includes: the second processing unit detecting that a positioning-related application is accidentally run in the background of the current first electronic device, for example: exercise and health, etc., selecting to turn off a corresponding application, and sending an instruction for stopping synchronizing positioning data to the first processing unit while clicking a key to turn off the application.

In an implementation of the present disclosure, the second processing unit sends an instruction for stopping synchronizing positioning data to the first processing unit when the second processing unit itself establishes a communication connection to the selected positioning system or determines that the communication with the selected positioning system is smooth.

For example, when the MCU synchronizes the obtained positioning data to the CPU, the synchronization will be repeated, and information for detecting whether the synchronization is successful is sent to the CPU until the CPU returns the information of successful synchronization, and the synchronization of the positioning data is stopped; and the MCU and the CPU respectively control their positioning modules, and receive the positioning data sent by the respective selected positioning systems.

It should be noted that the operation that the first processing unit stops synchronizing the obtained positioning data to the second processing unit may be executed before the operation 603 is completed, or may be executed when the operation 603 is not processed or partially completed, and the operation that the first processing unit synchronizes the obtained positioning data to the second processing unit may be stopped as long as it is determined that a second trigger condition for stopping the synchronization of the positioning data is met.

In this way, according to the data processing method, apparatus and system, and the computer-readable storage medium in the embodiments of the present disclosure, when the system run by the second processing unit having relatively high energy consumption is started or the positioning function is started, the positioning data of the first processing unit is synchronized to the second processing unit, so as to solve the problems of the second processing unit such as relatively high energy consumption for starting, relatively long delay for starting, and relatively long delay of the positioning data, thereby effectively reducing the starting energy consumption of the second processing unit, shortening the starting delay time, providing more accurate positioning data for the system, and improving the user experience of the electronic device.

Similarly, based on the forgoing data processing method, according to an embodiment of the present disclosure, there is further provided a computer-readable storage medium having a program stored thereon, and when the program is executed by a processor, the processor at least implements the following operation steps: operation 601, the first processing unit obtains positioning data of the first electronic device from the positioning system connected thereto and used to execute the positioning function; operation 602, the first processing unit synchronizes the obtained positioning information to the second processing unit, when it is determined that a first trigger condition for executing the synchronization of the positioning data is met; and operation 603, the second processing unit executes positioning-related processing according to the obtained positioning data.

Further, based on the forgoing data processing method, according to an embodiment of the present disclosure, there is further provided a data processing system, including a processor and a memory, where computer program instructions are stored in the memory, and when the computer program instructions are run by the processor, the forgoing data processing method is implemented.

Figure 7:
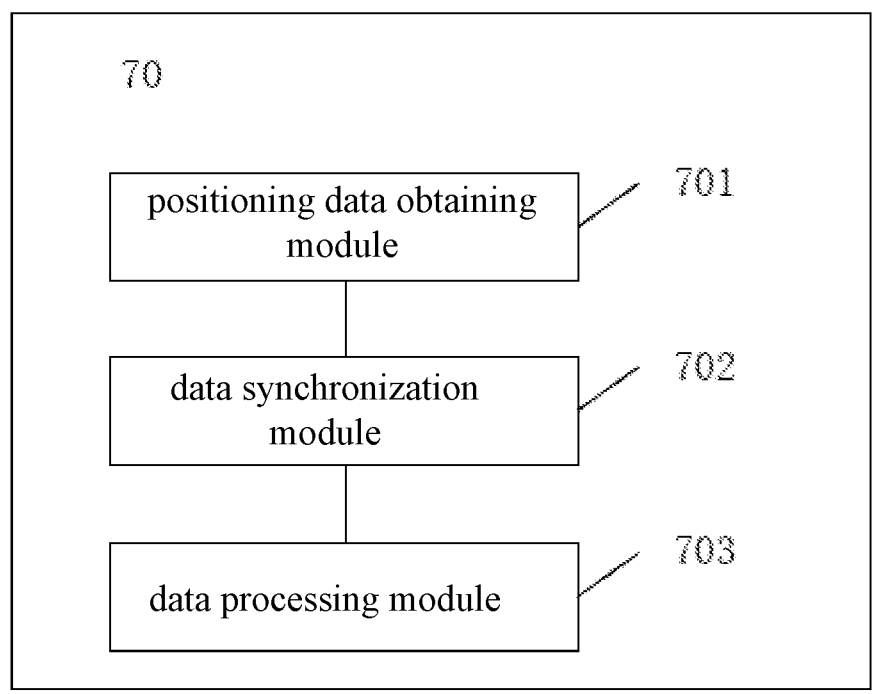
FIG. 7 is a schematic diagram of another constitutional structure of a data processing apparatus according to an embodiment of the present disclosure.

More further, based on the forgoing data processing method, according to an embodiment of the present disclosure, there is further provided a data processing apparatus, applied to a first electronic device, where the first electronic device includes a first processing unit that runs a first operating system and a second processing unit that runs a second operating system, and the working energy consumption of the first processing unit is less than the working energy consumption of the second processing unit. FIG. 7 is a schematic diagram of another constitutional structure of a data processing apparatus 70 according to an embodiment of the present disclosure. As shown in FIG. 7, the apparatus 70 includes: a positioning data obtaining module 701, configured to a first processing unit for obtaining positioning data of a first electronic device from a positioning system, to which the first processing unit is connected, used to execute a positioning function; a data synchronization module 702, configured to the first processing unit for synchronizing the obtained positioning data to a second processing unit, when it is determined that a first trigger condition for executing the synchronization of the positioning data is met; and a data processing module 703, configured to the second processing unit for executing positioning-related processing according to the obtained positioning data.

According to an implementation of the present disclosure, the first trigger condition is at least one of the following: the second processing unit starting and entering a working state; the first processing unit obtaining a positioning data synchronization instruction sent by the second processing unit; and the second processing unit starting a positioning-related application.

In an implementation of the present disclosure, the apparatus 70 further includes: a data stopping module, configured to, after the first processing unit synchronizes the obtained positioning data to the second processing unit, when it is determined that a second trigger condition for stopping the synchronization of the positioning data is met, the first processing unit for stopping synchronizing the obtained positioning data to the second processing unit; where the second trigger condition is at least one of the following: the second processing unit enters a non-working state; the first processing unit obtains an instruction, for stopping synchronizing positioning data, sent by the second processing unit; and a positioning-related application is not included in the applications run by the second processing unit.

It should be noted here that: the above description of the embodiment of the data processing apparatus and system in the embodiments of the present disclosure is similar to the foregoing description of the method embodiments shown in the FIGS. 1 and 6, and has similar beneficial effects to the foregoing method embodiments shown in the FIGS. 1 and 6, and therefore details are not described herein again. Reference is made to the foregoing description of method embodiments, shown in FIGS. 1 and 6, of the present disclosure for technical details which are not disclosed in the embodiments of data processing apparatus and system of the present disclosure, and therefore details are not described herein again to save space.

It should be noted that the terms "include", "comprise", or any variants thereof herein are intended to cover a non-exclusive inclusion, so that a process, method, article, or apparatus that includes a series of elements not only includes those elements, but also includes other elements not listed explicitly, or includes inherent elements of the process, method, article, or apparatus. In the absence of more limitations, an element defined by "include a . . . " does not exclude other same elements existing in the process, method, article, or apparatus including the element.

In the several embodiments provided in the present application, it should be understood that the disclosed device and method may also be implemented in another manner. The above-described device embodiments are merely schematic, for example, the division of the units is merely a logical function division, and there may be other division manners in actual realization, for example: a plurality of units or components may be combined or integrated into another system, or some features may be ignored or not executed. Another point is that the mutual coupling or direct coupling or communication connection shown or discussed may be indirect coupling or communication connection of the devices or units through some interfaces, and may be electrical, mechanical or in other forms.

The units described as separate components may or may not be physically separated, and the components displayed as units may or may not be physical units; the components may be located in one place, or may be distributed to a plurality of network units; and some or all of the units may be selected to achieve the objectives of the solutions in the embodiments according to actual needs.

In addition, various functional units in various embodiments of the present disclosure may all be integrated in one processing unit, or each unit may be individually used as one unit, or two or more units may be integrated in one unit; the above integrated units may be implemented in the form of hardware or in the form of hardware plus software functional units.

Those of ordinary skill in the art may understand that all or part of the steps for implementing the above method embodiments may be completed by a program instructing related hardware, the program may be stored in a computer-readable storage medium, and when the program is executed, the steps of the above method embodiments are implemented; and the storage medium include: a removable storage device, a read-only memory (ROM), a magnetic disk, or an optical disc, and another medium that can store program codes.

Or if implemented in a form of software functional units, and sold or used as independent products, the above integrated units of the present disclosure may be stored in a computer-readable storage medium. Based on this understanding, the technical solution of the present disclosure essentially or a part that contributes to the prior art may be embodied in a form of a software product; and the computer software product is stored in a storage medium and includes a plurality of instructions which are used to enable a computer device (which may be a personal computer, a server, or a network device, etc.) to execute all or part of the methods described in the various embodiments of the present disclosure. The foregoing storage medium includes: a removable storage device, a read-only memory (ROM), a magnetic disk, or an optical disk and another medium that can store program codes.

The above are merely specific implementations of the present disclosure, but the scope of protection of the present disclosure is not limited thereto, and any changes or replacements easily conceivable by those skilled in the art within the scope of the technology disclosed herein shall be covered within the scope of protection of the present disclosure. Therefore, the protection scope of the present disclosure shall be subject to the protection scope of the above claims.

What is claimed is:

1. A data processing method, applied to a first electronic device, wherein that the first electronic device comprises a first processing unit that runs a first operating system and a second processing unit that runs a second operating system, and the working energy consumption of the first processing unit is less than the working energy consumption of the second processing unit; the method comprising:

the first processing unit executing the selection of a positioning system, and storing selected positioning system information;

the first processing unit synchronizing the stored positioning system information to the second processing unit, when it is determined that a first trigger condition for executing the synchronization of the positioning system information is met; and the second processing unit executing positioning-related processing according to the obtained positioning system information, wherein the first processing unit supports communication connections with a plurality of positioning systems;

the first processing unit executing the selection of a positioning system comprises:

the first processing unit obtaining signal strength corresponding to the plurality of positioning systems, and selecting the positioning system having the highest signal strength therefrom; and determining the selected positioning system as a corresponding positioning system used by the first processing unit to execute a positioning function, to control a positioning module corresponding to the selected positioning system in the first processing unit to be in a working state and a positioning module corresponding to a non-selected positioning system to be in a non-working state.

2. The data processing method according to claim 1, wherein, after the selecting the positioning system having the highest strength, the method further comprises:

comparing the signal strength corresponding to the positioning system having the highest strength with a first threshold;

determining the positioning system having the highest strength as the selected positioning system when the signal strength corresponding to the positioning system having the highest strength is greater than or equal to the first threshold; and determining a second electronic device, to which the first electronic device is connected, having a positioning function, as the selected positioning system when the signal strength corresponding to the positioning system having the highest strength is less than the first threshold.

3. The data processing method according to claim 2, wherein the determining a second electronic device, to which the first electronic device is connected, having a positioning function, as the selected positioning system comprises:

obtaining signal strength between the second electronic device and the positioning system in communication connection therewith, and when the signal strength is greater than or equal to the first threshold, determining the second electronic device, to which the first electronic device is connected, having the positioning function, as the selected positioning system of the first processing unit.

4. The data processing method according to claim 1, wherein, after the determining the selected positioning system as the corresponding positioning system used by the first processing unit to execute the positioning function, the method further comprises:

obtaining signal strength of the first processing unit and the corresponding positioning system currently used to execute the positioning function, and comparing the obtained signal strength with a second threshold;

when the obtained signal strength is less than the second threshold, reobtaining current signal strength, corresponding to the plurality of positioning systems, obtained by the first processing unit, and selecting the positioning system having the highest current signal strength therefrom;

determining the positioning system having the highest current signal strength as a new selected positioning system, when the signal strength corresponding to the positioning system having the highest current signal strength is greater than or equal to the first threshold; and switching the positioning system used to execute the positioning function to the new selected positioning system, when the new selected positioning system and the positioning system used to execute the positioning function are not the same positioning system.

5. The data processing method according to claim 1, wherein the first electronic device is a wearable electronic device, the first processing unit is a microcontroller unit (MCU), and the second processing unit is a central processing unit (CPU).

6. A data processing system, comprising a processor and a memory, wherein computer program instructions are stored in the memory, and when the computer program instructions are run by the processor, the data processing method according to claim 1 is implemented.

7. A data processing apparatus, applied to a first electronic device, wherein the first electronic device comprises a first processing unit that runs a first operating system and a second processing unit that runs a second operating system, and the working energy consumption of the first processing unit is less than the working energy consumption of the second processing unit; the apparatus comprising:

a selection module, configured to the first processing unit for executing the selection of a positioning system and storing selected positioning system information;

an information synchronization module, configured to the first processing unit for synchronizing the stored positioning system information to the second processing unit, when it is determined that a first trigger condition for executing the synchronization of the positioning system information is met; and an information processing module, configured to the second processing unit for executing positioning-related processing according to the obtained positioning system information, wherein the first processing unit supports communication connections with a plurality of positioning systems; and the selection module comprises:

a strength determination submodule, configured to the first processing unit for obtaining the signal strength corresponding to the plurality of positioning systems and selecting the positioning system having the highest signal strength therefrom; and a state control submodule, configured to determine the selected positioning system as the corresponding positioning system used by the first processing unit to execute the positioning function, and control a positioning module corresponding to the selected positioning system in the first processing unit to be in a working state, and a positioning module corresponding to the non-selected positioning system to be in a non-working state.

* * * * *